Oct. 29, 1935.  G. O. HARM  2,019,451
AUTOMATIC LOADING AND UNLOADING TRUCK
Filed March 6, 1934  4 Sheets-Sheet 1
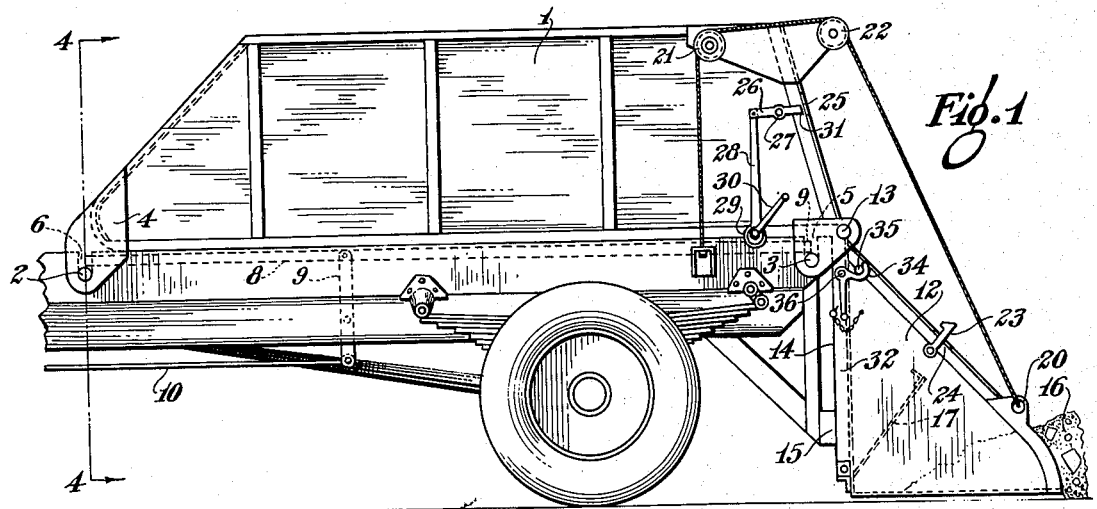
Fig.1
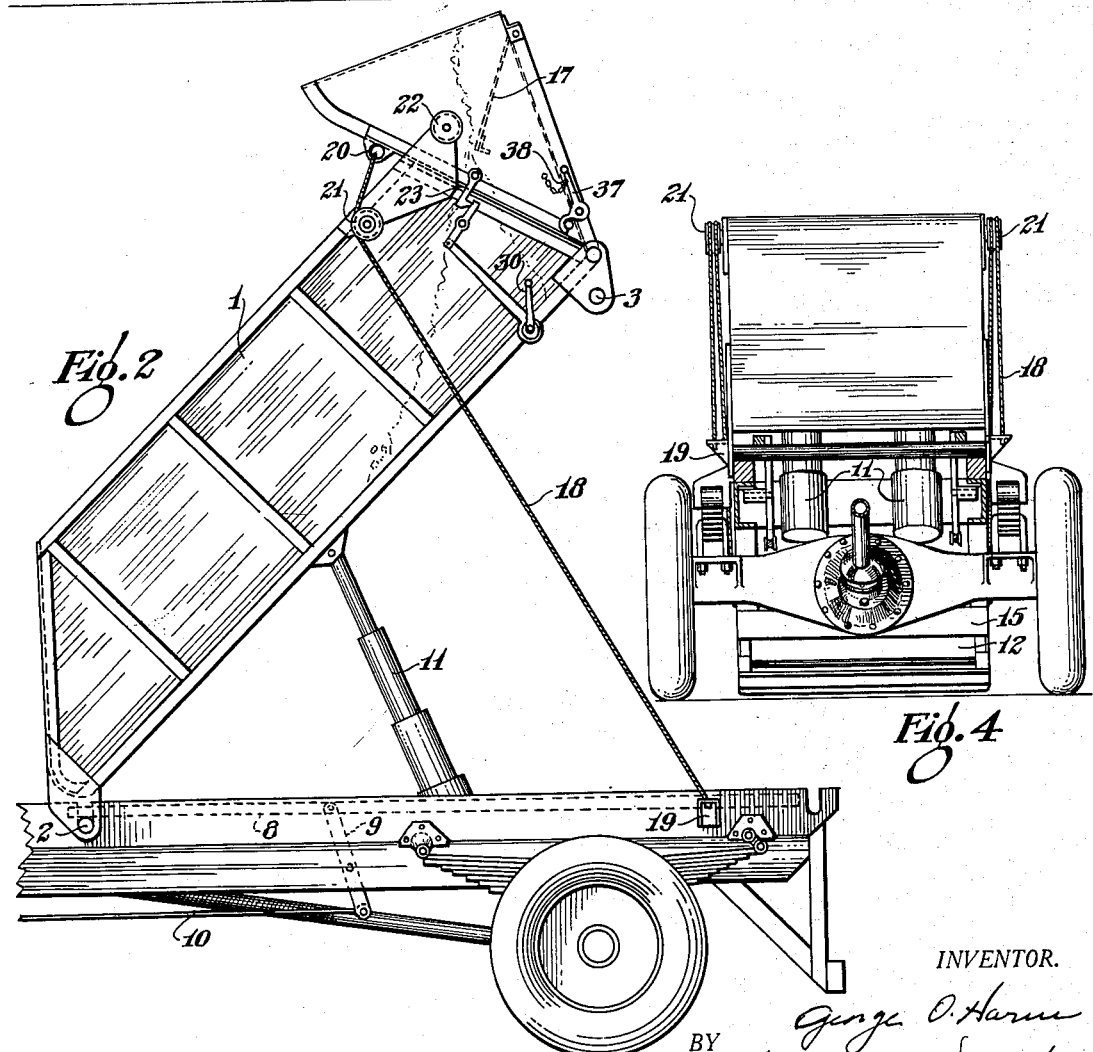
Fig.2
Fig.4
INVENTOR.
George O. Harm
BY
Haugrood & Van Horn
his ATTORNEYS Oct. 29, 1935.  G. O. HARM  2,019,451
AUTOMATIC LOADING AND UNLOADING TRUCK
Filed March 6, 1934    4 Sheets-Sheet 2
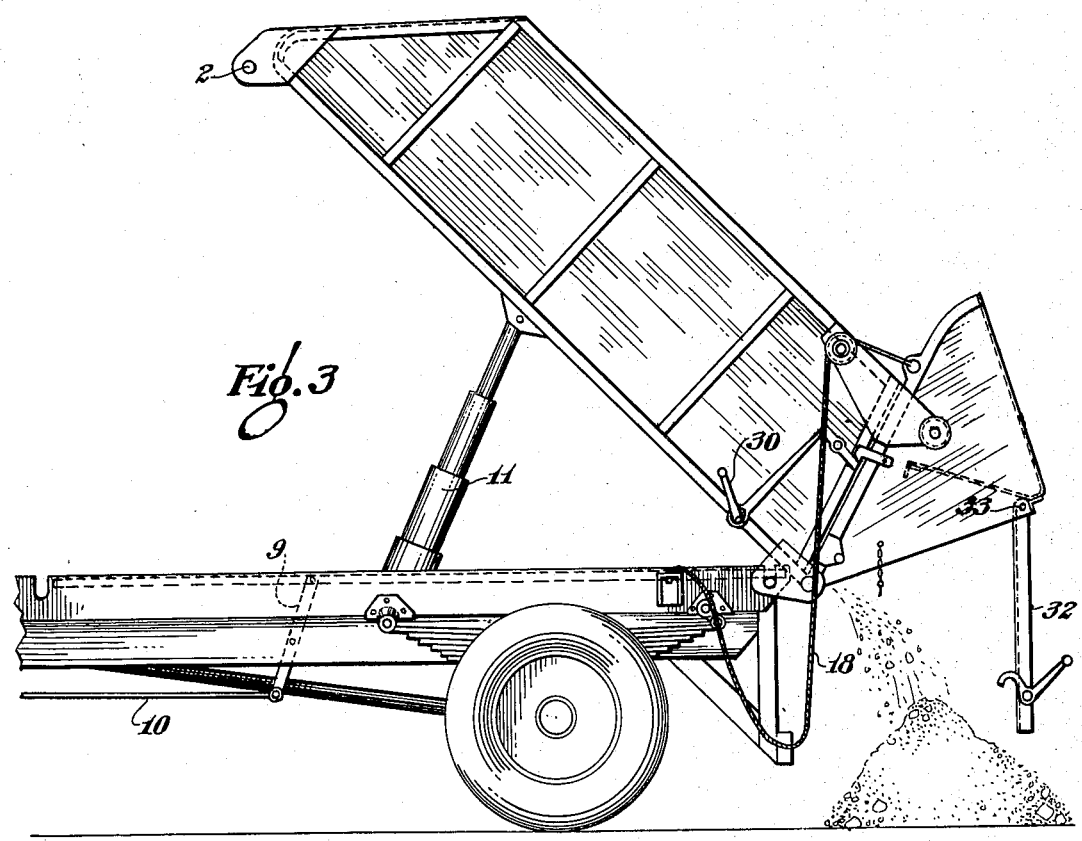
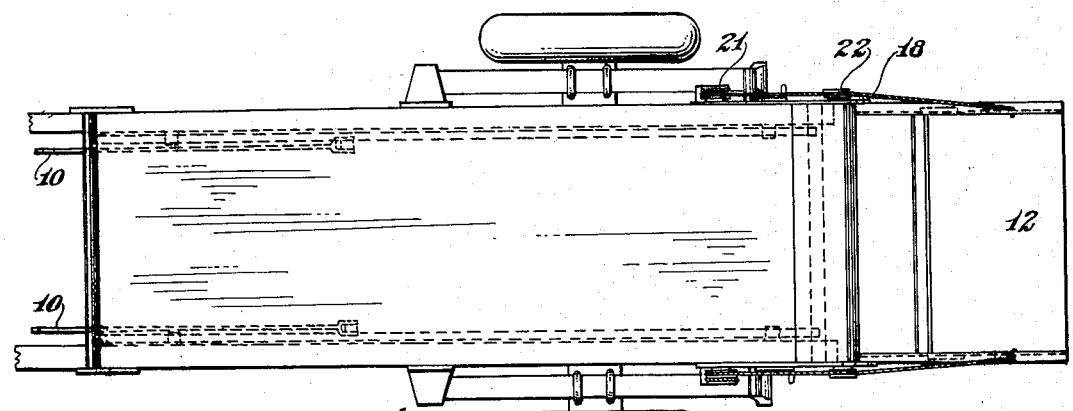
INVENTOR.
George O. Harm
BY Hawgood & Van Horn
his ATTORNEYS Oct. 29, 1935.  G. O. HARM  2,019,451
AUTOMATIC LOADING AND UNLOADING TRUCK
Filed March 6, 1934   4 Sheets-Sheet 3
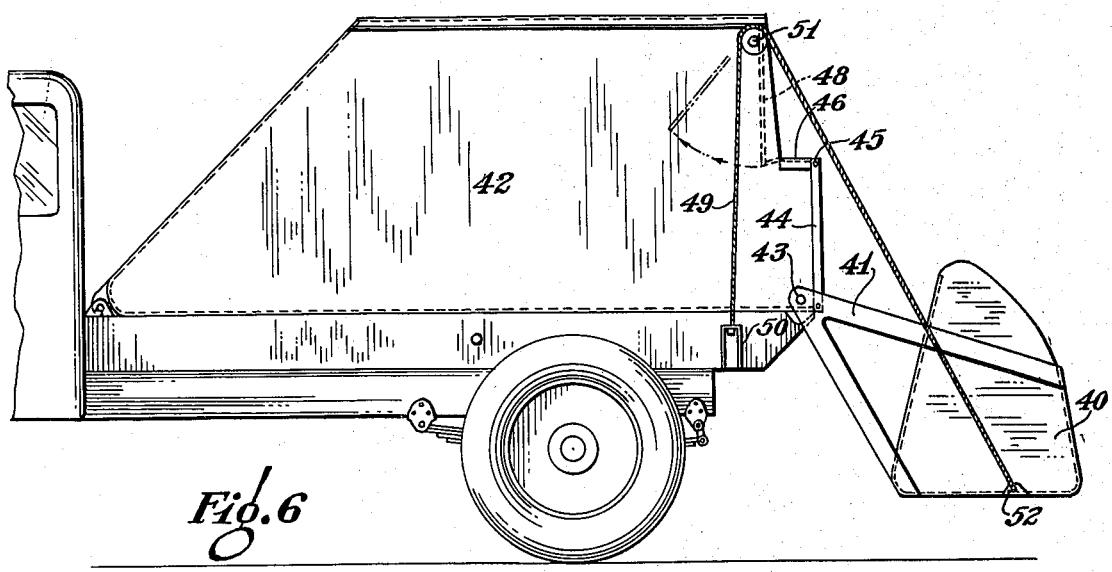
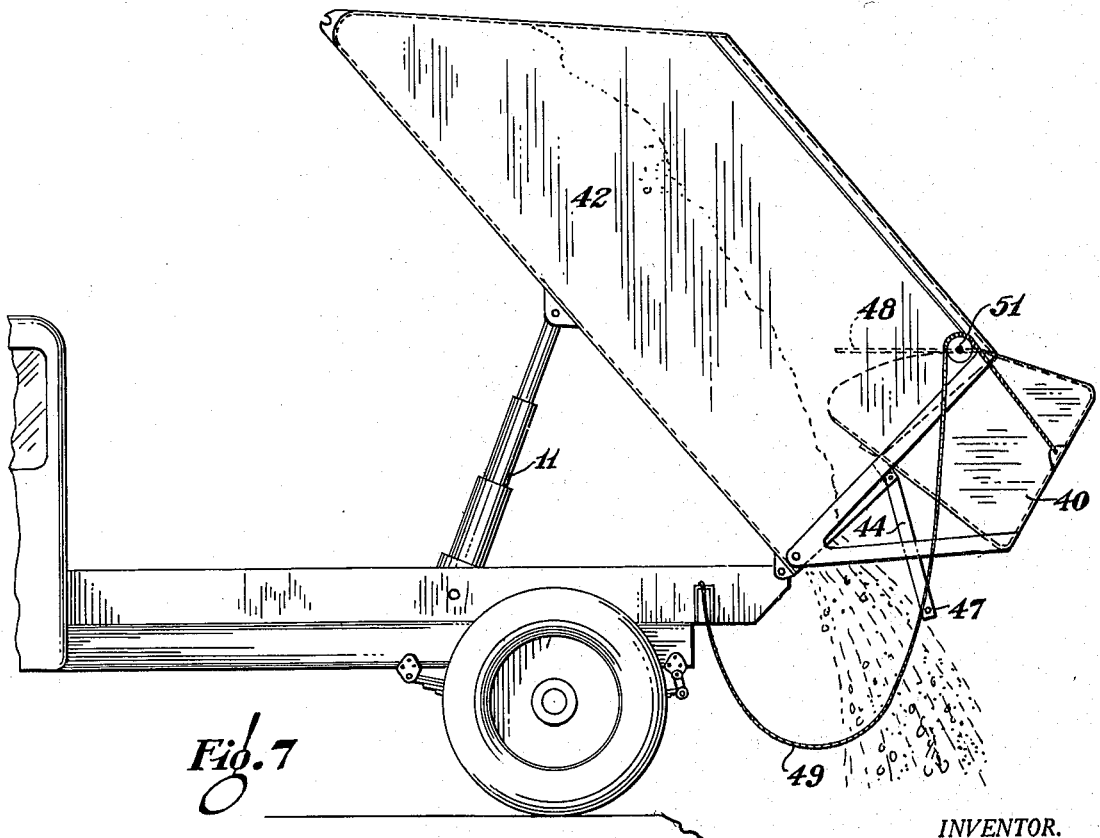

Oct. 29, 1935.  G. O. HARM  2,019,451
AUTOMATIC LOADING AND UNLOADING TRUCK
Filed March 6, 1934  4 Sheets-Sheet 4

INVENTOR.
George O. Harm
BY
Haugord & Van Horn
his ATTORNEYS

Patented Oct. 29, 1935

2,019,451

UNITED STATES PATENT OFFICE 2,019,451

AUTOMATIC LOADING AND UNLOADING TRUCK

George O. Harm, Warren, Ohio, assignor to The Stevens Metal Products Company, Niles, Ohio, a corporation of Ohio Application March 6, 1934, Serial No. 714,283

11 Claims. (Cl. 214—78)

My invention is an improvement in self-loading and unloading bodies and relates more particularly to that type mounted on a vehicle frame and which is operated from the power plant of the vehicle for handling and transporting materials, such as garbage, ashes or other refuse, and other materials.

It is one of the objects of this invention to simplify the handling and transportation of materials by mounting on a fixed or movable support a tiltable body having associated therewith a simple means for automatically loading and/or unloading the materials when the body is tilted.

Another object of the invention is to further simplify and improve self-loading and unloading truck bodies by providing a loader which is actuated by one selected movement of the body to pick up and load the materials into the body, and which is actuated by another selected movement of the body to release the loaded materials through an end of the body in the manner of an end gate.

A further object of this invention resides in operating the body in its various movements by means of the power plant of the vehicle or truck upon which it is mounted, and to selectively actuate the loading and unloading means from such power source.

A still further object of this invention consists in constructing a loading device or scoop and applying the same so that it will be effective as a combined loader and tail gate for the vehicle body.

Other objects and advantages of my invention will become more apparent as the following description of two embodiments thereof progresses, reference being made to the accompanying drawings in which like reference characters are employed to designate like parts throughout the same.

In the drawings:

Figure 1 is a side elevation of one embodiment of my invention and shows the truck body in normal load transporting position, while the scoop or loader is shown in position to scoop up a load when the truck is backed up toward the load;

Figure 2 is a view similar to that shown in Figure 1, and shows the body rear end raised to permit the loaded scoop to discharge its load into the truck body;

Figure 3 is a side elevation and shows the truck body tilted so that its front end is elevated as in dumping its contents. In this view the combined scoop and tail gate is shown in position to release the load through the same to the ground;

Figure 4 is an end section taken in the direction of line 4—4 of Figure 1; and

Figure 5 is a top plan view of the vehicle body and loader with the parts in position as shown in Figure 1;

Figure 6 is a side elevation of a second embodiment of my invention showing the loading bucket in lower position to be filled;

Figure 7 is a view similar to that shown in Figure 6 and shows the truck body tilted on its rear end to dump the load through the tail gate;

Figure 8:
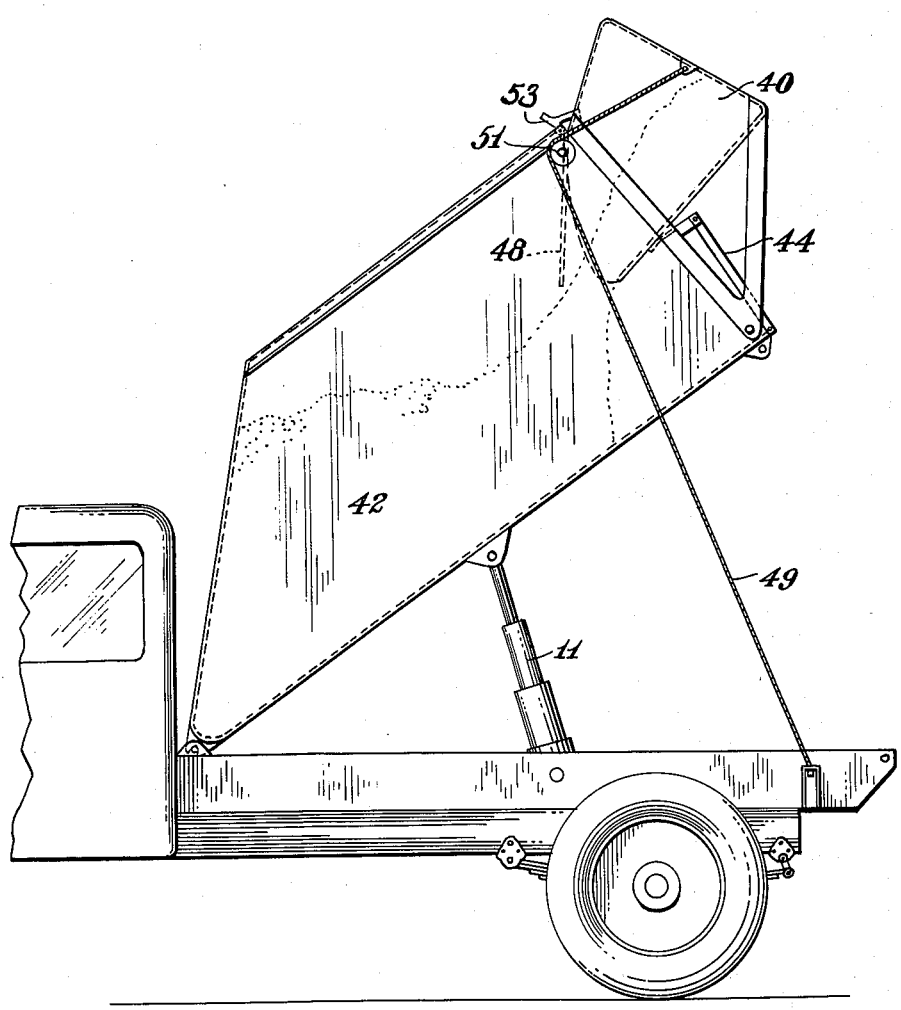
Figure 8 shows the truck body tilted on its forward end for loading the same, the bucket having been raised to a position whereby its contents may be discharged directly into the truck body.

Referring now more particularly to the drawings which illustrate one embodiment of my invention, I have shown the same applied to a truck body 1 which is tiltably supported at 2 and at 3 on the chassis, to permit the truck body to be selectively tilted or hoisted from either end. The trunnions 2 and 3 may consist of steel shafts extending transversely of the truck at each end thereof and are carried by the plates 4 and 5 fixed to the truck body. These trunnions 2 and 3 engage slots 6 and 7 respectively in the truck frame, and either trunnion is locked in its respective slot by means of a reciprocating bar, which is operated through a lever 9 and a rod 10 extending forwardly of the truck and which has suitable operating connections with the cab of the truck to permit the operator to shift the bar 8 in either direction. When the bar 8 is in neutral position, both trunnions are locked in their slots as shown in Figure 1. When the bar is moved forwardly, the rear trunnion 3 is released and the forward trunnion 2 locked so that when the hoist 11 is operated, the rear end of the truck is hoisted, shown more particularly in Figure 2 as in loading the truck body. When the operator desires to discharge or unload the contents of the truck body from a normal or horizontal position of the same, the locking bar 8 is shifted in the opposite direction, thus locking the rear trunnion 3 and releasing the forward trunnion 2. This is shown more particularly in Figure 3 where the hoist 11 has been operated and the forward end of the truck body is hoisted to dumping position.

In further carrying out my invention I have provided a scoop or bucket 12 which may be manipulated to cooperate with the truck body 1 to load the same when the truck body is hoisted on the trunnion 2, and to unload the same when the truck body is hoisted on the trunnion 3. In the transportation of materials within the truck body the said scoop or bucket 12 further cooperates with the truck body to retain the materials therein and its functions in this connection are somewhat similar to those of an end gate.

The loading scoop 12 is pivotally supported on the body 1 at 13. The member 13 may be a steel shaft or pipe extending across an end of the scoop so that the top of the shaft 13 is substantially flush with the floor of the truck body. The scoop 12 is designed so that its rear wall 14 will come to rest against a bumper or supporting bar 15 which extends transversely of the truck body and below the same when the scoop is lowered to the position shown in Figure 1 for picking up a load of material to be deposited in the truck body. The receiving end of the scoop 12 is so designed that when the scoop is lowered to the position shown in Figure 1 it will be positioned close to the ground and substantially parallel thereto, so that the edge of the scoop can readily be thrust under a load such as is indicated at 16, whereby the load will be picked up by the scoop when the driver backs the truck against or toward the load on the ground. A deflector plate 17 is secured within the scoop and extends across the same to prevent material from falling toward the pivot point 13 as the scoop is raised. In this manner the material is discharged at a higher point in the truck body thereby more evenly distributing the material as it is loaded into the truck body.

The scoop 12 with its load is raised to the position, with respect to the truck body as indicated in Figure 2, by means of a cable 18. One end of the cable 18 is anchored in the bracket 19 fixed to the truck frame, while the other end of the cable is fixed to the scoop as at 20. The cable operates over a pair of pulleys or sheaves 21 and 22, the former of which is designed to take two convolutions of the cable for purposes which will be described more fully hereinafter.

Referring more particularly to Figure 2 of the drawings, it will be seen that when the truck 1 is hoisted on the trunnion 2 the cable 18 will operate to lift the scoop 12 from its position shown in Figure 1 to the position shown in Figure 2. The operation of the scoop in this manner is automatic and depends upon the manner of hoisting the truck body as just described. With the scoop in the position shown in Figure 2, its load will be deposited into the truck body as indicated and the deflector plate 17 directly discharges the load to the truck body at an elevation above trunnion or shaft 13. When the truck body is loaded to the desired point, the scoop 12 may be locked in the position shown in Figure 2 by means of a latch 23 pivotally carried on the loading scoop and operating through an opening 24 in a side edge of the scoop. The latch 23 also passes through an opening 25 at the side of the truck body to engage a trip lever 26 which is pivotally mounted at 27 to the truck body. An end of the lever 26 is pivotally connected to a lever 28, the other end of the lever 28 having a rotating cam connection as at 29 with an operating handle 30. The lever 26 is so placed on the truck body that when the handle 30 of the cam 29 is turned so that the cam is down, the pivoted bar 26 and particularly its rearward end 31, is flush with the lower edge of the opening 25, so that the latch 23 does not engage the edge of the opening 25 to thereby lock the scoop in raised position until the handle 30 and the cam 29 are raised to permit the end 31 of the lever 26 to be lowered and thus engage the hooked end of the latch 23 projecting through the opening 25. Thus before the scoop is latched or locked into the position shown in Figure 2 with respect to the truck body, the truck body may be lowered again to repeat the charging operation of the scoop and to permit it to swing down to the ground to pick up additional loads.

When the operator desires to hold the scoop in the raised position the handle 30 is operated to lift the member 28, and when the latch 23 comes through the opening 25 it will drop down engaging the edge of the angle bar of the truck to lock the scoop in raised position. In this position the scoop functions as an end gate.

In dumping or unloading the truck, the scoop 12 plays an important part in this operation. The scoop 12 is provided with a gate 32 which is pivoted thereto at 33 and which performs the function of an end gate on the truck when the loading scoop is in raised position. The gate 32 is held in closed position by means of a dog 34 engaging a pin 35, the dog being pivotally carried as at 36 on the gate 32 near the free end thereof. The dog 34 is operated by means of a handle 37 and to prevent accidental release of the dog, a pin 38 is provided. This pin is chained to the scoop to prevent loss. The dog 34 and the cam connection 29 preferably are attached to shafts which extend across the truck body and operate similar mechanism on opposite sides thereof so that the latching and unlatching simultaneously occurs on both sides of the truck.

As hereinbefore described, the cable 18 is utilized to automatically lift and lower the scoop 12 with respect to the truck body during the several operations in automatically loading and unloading the truck body. This cable 18, which is duplicated on opposite sides of the truck, runs over the free running pulleys or sheaves 21 and 22 and preferably is given two turns around the pulley 21 which is free running in a counter clockwise direction and which engages a friction clutch (not shown) when revolving in the opposite direction to break or retard the descent of the scoop.

It will be seen from the above description and from the drawings illustrating the embodiment described, that I have combined with a truck body, a scoop for loading the body directly from the ground and which is operated to pick up a load and dump the same into the body automatically with the hoisting of the rear end of the truck body, and that the same scoop, when the body is loaded functions as an end gate to retain the load within the truck body, and, when it is desired to discharge the load, to likewise function in that capacity by releasing the gate 32 which forms one wall of the scoop.

It will be seen that by means of this invention the automatic pick-up, loading, and subsequent unloading of materials may be accomplished by means of a very simple apparatus carried by the truck, the operation of which is simple, automatic and positive.

In Figures 6, 7 and 8 I have illustrated another embodiment of my invention which in many respects is similar to that heretofore described. However in the present embodiment the loading bucket is designed to be filled by hand as distinguished from the scoop 12 in the first embodiment which projects close to the ground and may be self-loading when the truck is backed against a load of material on the pavement.

In Figures 6 to 8 inclusive the loading bucket 40 is pivotally supported to the rear end of the truck body 42 as at 43, by means of the brackets 41 operating on each side of the truck body 42. The open rear end of the truck body is partially closed by a tail gate 44 hingedly mounted thereto at 45 upon a transverse member 46. The end gate 44 is extended so that it may swing freely outwardly when the truck body is hoisted to a load dumping position as shown in Figure 7, although the end gate may be locked in place to close the lower or discharge end of the truck body during transportation of materials therein. The tail gate may be removably locked in closed position by inserting a pin through the opening 47 and through the end wall of the truck body. Any suitable releasable means may be used for locking or latching the tail gate in closed position.

The upper open portion of the end of the body 42 is normally closed by means of a freely hinged gate 48, when the loading bucket is withdrawn from the opening. The opening in the upper part of the rear end of the truck body which is normally closed by the gate 48 is adapted to receive the loading bucket 40 when the same is hoisted to a position shown in Figures 7 and 8 to permit the bucket to dump its contents directly into the truck body as illustrated in Figure 8. I have provided very simple means for hoisting the loading bucket 40 which may consist of cables 49 operating on each side of the body 42. The cables are anchored at one end in a bracket 50 fixed to the truck chassis and operate over pulleys 51, as illustrated. The other ends of the cable 49 are fastened to the loading bucket 40 as at 52.

It will be seen that when the truck body 42 is hoisted by means of the hoist 11, upon its forward end the cable 49 will operate over the pulleys as the truck body is lifted and will cause the loading bucket 40 to be lifted to the position shown in Figure 8, that is, to enter the opening in the upper rear end of the truck body which is normally closed by the gate 48. When the loading bucket enters this opening the gate 48 will be moved to the position shown in this figure, partly by gravity. When the bucket is in this position and the tail gate 44 is closed it will be seen that the complete rear end of the truck body 42 will be closed, and, if desired, the bucket may be carried in this position when the truck is transporting materials thus completely closing the covered body of the truck. The latch 53 may be provided to retain the bucket 40 in this position, the latch being manually operated if desired to quickly release the bucket when the truck body is resting on the chassis or is in a substantial horizontal position. In this event, since there will be some slack in the cable 49, the bucket may be released and dropped to the position shown in Figure 6 for loading.

From the foregoing it will be seen that this second embodiment of my invention is similar to the first embodiment described herein in many respects and that I have provided very simple and sturdy mechanism for carrying out this embodiment of my invention.

Various changes in the details of construction and arrangement of parts may be made without departing from the spirit of my invention or the scope of the appended claims.

I claim:

1. A self-loading and unloading apparatus comprising an elongated body tiltable at its ends for compact loading and for discharging its contents, a loading scoop pivotally carried by the body and operating to dump its contents into said body when the body is tilted from one end, and means carried by the body and connected with the scoop to operate the same when the body is tilted.

2. A self-loading and dumping vehicle comprising a body tiltable at either of its ends on said vehicle, means intermediate the body ends for selectively tilting either end of the body about its opposite end as a pivot for loading compactly or dumping, a scoop pivotally connected with said body for discharging its loads into the body when the body is tilted on one end and for retaining materials in said body when the latter is in normal position, and means automatically responsive to a tilting of said body in one direction for operating said scoop.

3. A self-loading and dumping vehicle comprising a body tiltable at either of its ends on said vehicle, means intermediate the body ends for selectively tilting either end of the body about its opposite end as a pivot for loading compactly or dumping, a scoop pivotally connected with said body for discharging its loads into the body when the body is tilted on one end, one wall of said scoop constituting a pivoted gate to permit discharge of materials from the body through the scoop when the body is tilted on its other end, and means automatically responsive to a tilting of the body on one end for operating said scoop.

4. In a self-loading and dumping truck including a load carrying body having an open end and means for hoisting said body on one end for loading and on its other end for dumping, a loading scoop pivotally carried by the body, said scoop when in one position being adapted to engage and pick up a load of material and when swung to close the open end of the body to discharge said load into said body, and automatic means responsive to a movement of the body from its normal load carrying position to actuate said scoop.

5. In a self-loading and dumping truck including a load carrying body having an open end and means for hoisting said body on either end, a loading scoop pivotally carried by the body, said scoop when in one position being adapted to engage and pick up a load of material and when swung to close the open end of the body to discharge said load into said body, and automatic means responsive to a movement of the body from its normal load carrying position to actuate said scoop, one wall of said scoop being removable from its normal load retaining position to permit materials in the truck body to be discharged through the scoop.

6. In a self-loading and dumping truck including a load carrying body having an open end and means for hoisting said body on either end, a loading scoop pivotally carried by the body, said scoop when in one position being adapted to engage and pick up a load of material and when swung to close the open end of the body to discharge said load into said body, and automatic means responsive to a movement of the body from its normal load carrying position to actuate said scoop, one wall of said scoop being removable from its normal load retaining position to permit materials in the truck body to be discharged through the scoop, and a latch for locking said movable wall in closed position.

7. In a self-loading and dumping truck including a load carrying body having an open end and means for hoisting said body on either end, a loading scoop pivotally carried by the body, said scoop when in one position being adapted to engage and pick up a load of material and when swung to close the open end of the body to discharge said load into said body, means for locking said scoop in said body end closing position, and automatic means responsive to a movement of the body from its normal load carrying position to actuate said scoop.

8. In a self-loading and dumping truck including a load carrying body having an open end and means for hoisting said body on either end, a loading scoop pivotally carried by the body, said scoop when in one position being adapted to engage and pick up a load of material and when swung to close the open end of the body to discharge said load into said body, means for locking said scoop in said body end closing position, and automatic means responsive to a movement of the body from its normal load carrying position to actuate said scoop, one wall of said scoop being removable from its normal load retaining position to permit materials in the truck body to be discharged through the scoop.

9. In a self-loading and dumping truck including a load carrying body having an open end and means for hoisting said body on either end, a loading scoop pivotally carried by the body, said scoop when in one position being adapted to engage and pick up a load of material and when swung to close the open end of the body to discharge said load into said body, releasable means for locking said scoop in said body end closing position, and automatic means responsive to a movement of the body from its normal load carrying position to actuate said scoop.

10. In a self-loading and dumping truck including a load carrying body having an open end and means for hoisting said body on one end for loading and on its other end for dumping, a loading scoop pivotally carried by the body, said scoop when in one position being adapted to engage and pick up a load of material and when swung to another position to discharge said load into said body, a cable anchored at one end to said body and connected at its other end with said scoop to actuate said scoop when the body is moved from its normal load carrying position, and sheaves supported on the body for receiving said cable.

11. A self-loading and dumping truck comprising a chassis, a load carrying body having an open end and selectively pivoted on the chassis at its ends, hoisting means between the pivoted ends of the body, a loading scoop pivotally attached to one end of the body, means actuated by the body when hoisted on one end to discharge material from the scoop into the body, and latching means to hold the scoop in raised position to permit dumping of the load through the body open end when said body is hoisted on said open end.

GEORGE O. HARM.